United States Patent [19]
Stekelenburg

[11] Patent Number: 5,510,836
[45] Date of Patent: Apr. 23, 1996

[54] SOLID STATE IMAGING DEVICE HAVING AN ADJUSTABLE WIDTH/HEIGHT RATIO

[75] Inventor: Michael A. W. Stekelenburg, Eindhoven, Netherlands

[73] Assignee: U.S. Philips Corporation, New York, N.Y.

[21] Appl. No.: 310,504

[22] Filed: Sep. 22, 1994

Related U.S. Application Data

[63] Continuation of Ser. No. 991,692, Dec. 16, 1992, abandoned.

[30] Foreign Application Priority Data

Dec. 18, 1991 [EP] European Pat. Off. .............. 91203339

[51] Int. Cl.$^6$ ...................................................... H04N 5/335
[52] U.S. Cl. ........................... 348/299; 348/311; 348/294
[58] Field of Search ...................................... 348/297, 299, 348/314, 316, 311, 320, 312, 294, 207, 239, 240; H04N 5/335

[56] References Cited

U.S. PATENT DOCUMENTS

| | | | |
|---|---|---|---|
| 4,426,664 | 1/1984 | Nagumo et al. ........................ | 348/311 |
| 4,644,405 | 2/1987 | Roy et al. ............................ | 358/213.26 |
| 4,841,369 | 6/1989 | Nishizawa et al. ..................... | 348/302 |
| 5,036,397 | 7/1991 | Nagabusa .............................. | 348/311 |
| 5,055,930 | 10/1991 | Dagasaki et al. ................... | 358/213.11 |
| 5,196,939 | 3/1993 | Elabd et al. .......................... | 348/314 |

FOREIGN PATENT DOCUMENTS

| | | | |
|---|---|---|---|
| 3919149 | 12/1990 | Germany ........................ | H04N 5/225 |
| 3-32176 | 2/1991 | Japan ............................ | H04N 5/335 |
| 2098827 | 11/1982 | United Kingdom ............. | H04N 9/04 |

Primary Examiner—Joseph Mancuso
Assistant Examiner—Tuan V. Ho
Attorney, Agent, or Firm—Steven R. Biren

[57] ABSTRACT

A charge-coupled imaging device has a width/height ratio which is adjustable since a number of columns situated in two strips on either side of the sensor are not used. The charge generated in these columns is placed in the horizontal output register simultaneously with the active information which is to be used, and is drained off in the flyback time between consecutive active line times through the output of the output register. Since the non-active strips are situated on either side of the sensor, the location of the center of the active portion of the matrix is fixed, independent of whether the information from the said strips is or is not used, so that in every state of the sensor this center coincides with the optical center of the optical system used.

8 Claims, 1 Drawing Sheet

SOLID STATE IMAGING DEVICE HAVING AN ADJUSTABLE WIDTH/HEIGHT RATIO

This is a continuation of application Ser. No. 991,692, filed Dec. 16, 1992 now abandoned.

BACKGROUND OF THE INVENTION

The invention relates to a solid state imaging device comprising a system of sensor elements arranged in rows and columns for converting radiation into electric charges which can be transported parallel to the column direction by vertical transport means to a horizontal readout register in the form of a charge-coupled device into which the charges are entered row by row and subsequently read out at an output of the horizontal register during a certain time interval, called active line time hereinafter, means being present by which the device can be set in either of two states, whereby in a first state the signals from all columns of the system are used and in the second state the signals from a number of columns are not used. The invention also relates to a camera provided with such an imaging device.

The device may in this case be formed by a monolithically integrated circuit in which the sensor elements in the form of photodiodes or MOS diodes are accommodated together with the vertical transport means and the horizontal readout register in a common semiconductor body made of, for example, silicon. The vertical transport means are usually formed by charge-coupled devices which either coincide with the photosensitive elements, such as, for example, in the case of frame transfer sensors (FT sensors), or are provided interposed between columns of separate photosensitive elements (interline sensors). In alternative embodiments, the photosensitive elements and the horizontal register may be manufactured in different semiconductor bodies, for example, when requirements are set for the photosensitivity which are not compatible with the requirements set for the readout register. It is noted here that the terms "horizontal" and "vertical" are to be understood in a relative sense only, not in an absolute sense, merely indicating that the transport in the readout register is transverse to the transport by the said transport means.

The possibility of effectively switching off a number of columns renders it possible to obtain an imaging device which satisfies the requirements of different standards, so that it is not necessary to design an adapted device and/or camera separately for each standard.

U.S. Pat. No. 4,426,664 discloses a charge-coupled imaging device of the kind mentioned in the opening paragraph which can be used both in the NTSC system and in the PAL or SECAM system. The imaging device is for this purpose provided with as many rows and columns as are necessary for use in the PAL or SECAM system. For use in the NTSC system, a number of lines as well as a number of columns are not used in that the electric charge generated in the relevant columns is drained off instead of being processed further as video information. For this purpose, the readout register is coupled at one end, i.e. the left-hand end, to an output terminal where the video information can be derived, and at the opposite end, so the right-hand end, to a drain for draining off the information which is not used. This charge is generated in a strip of columns at the right-hand side of the imaging device. During operation in the NTSC setting, a full line including the unnecessary charge packages from the strip of columns mentioned above is transported into the readout register each time. The active video information is transported to the left during the active line time in order to be read out. Simultaneously, the transport direction is reversed in the portion of the readout register in which the non-active information is stored, so that the relevant charge can be drained off at the right-hand end of the readout register.

One of the disadvantages of such a device is that the optical center in at least one of the two states does not coincide with the center of the portion of the imaging device which is in use. The luminous intensity is generally highest in the optical center in a system of lenses, such as in a camera, and decreases towards the edges to a value which is visibly lower at the edges. A similar profile is often found in the resolution of the optical system. This non-uniform intensity, possibly coupled to a decreasing resolution, is not unpleasantly noticeable during display as long as the intensity and the resolution are highest in the center of the displayed picture. If, however, the centers do not coincide, as is the case in the imaging device described above, the intensity maximum, and possibly the resolution maximum, will not lie in the center during picture display, which will in general be felt to be very unsatisfactory.

Such problems may also occur in situations other than that described above, when the information from a number of columns is not used. Thus it is very important for the optical center of the lens to coincide always with the center of the imaging device when a zoom lens is used.

SUMMARY OF THE INVENTION

The invention has for its object inter alia to provide an imaging device of the kind mentioned in the opening paragraph whose center does not or at least substantially not change its place when the number of columns used is changed.

According to the invention, an imaging device of the kind mentioned in the opening paragraph is characterized in that the columns not used in the second state of the device form two strips of columns on either side of the system, the charges derived from these columns being transferred to the horizontal readout register simultaneously with the charges from the columns which are used and being drained from the register in a time interval which lies between two consecutive active line times. Since the non-active information is not drained in the active line time, it is possible to define a strip of columns also at the side of the output amplifier whose charges or information/signal packages are not used. The charge packages from these columns are transported into the readout register simultaneously with the active information and drained off before the start of the active line time without interfering with the active information.

The charge packages coming from the strip of columns at the opposite edge, so farthest removed from the output amplifier, can be drained off in the manner described above through a reversal of the transport direction. An alternative embodiment, in which this reversal of the transport direction is not necessary, is characterized in that, in the said second state, the charges coming from the unused columns are transported into the horizontal register in the same direction as the used columns and are drained off partly before the active line time in which the used charges are read out and partly after this active line time. Preferably, these packages are drained off together with non-active information from the next row after the next row of information has been transported into the readout register. An embodiment which has the advantage that the number of transport steps is reduced in that charge packages of non-active information from two consecutive rows are partly joined together, is characterized in that the horizontal register is provided with charge storage locations having a charge storage capacity which is at least substantially double the charge storage capacity of the sensor elements. The charge storage capacity may be determined in various manners, for example, through the width of the gate electrodes and of the channel.

According to an important aspect of the invention, it is possible to adjust the width/height ratio of a solid state imaging device. Usual imaging devices have a width/height ratio of 4 to 3, analogous to the ratio of a TV screen. In the near future there will also be TV receivers on the market having a relatively greater width, the said ratio becoming 16 to 9 then. The picture ratio of the imaging device must be a corresponding one for such systems. It would be expensive and complicated if TV studios were to require two types of camera for these two types of pictures. The application of the invention renders it possible to design an imaging device with a 16 to 9 image ratio, having a central portion having a 4 to 3 image ratio which has a sufficient resolution for the present standard, for example, 750 pixels per line with two added portions of, for example, 125 pixels per line on the left and on the right. An important embodiment of a solid state imaging device according to the invention is characterized in that the system has a width/height ratio of at least approximately 16 to 9 in the first state and in that the width/height ratio of the system minus the columns not used in the second state is at least approximately 4 to 3.

BRIEF DESCRIPTION OF THE DRAWING

The invention will be explained in more detail with reference to several examples and the accompanying diagrammatic drawing in which.

DESCRIPTION OF THE PREFERRED EMBODIMENTS

Figure 1:
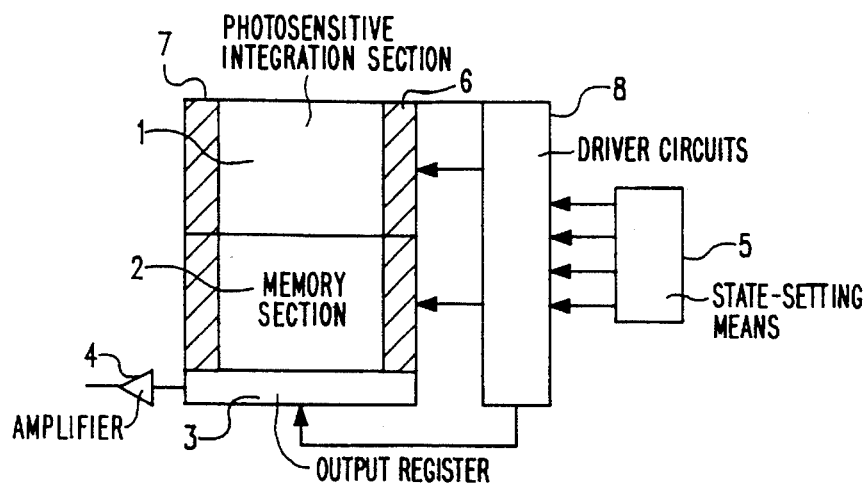
FIG. 1 is a diagram of a solid state imaging device according to the invention.

The invention will be described with reference to a charge-coupled imaging device of the frame transfer (FT) type, although the imaging device may equally well be of another type which is known per se, as will be apparent from the following description, such as the IL type (inter line) or of the IL type with frame transfer. In this last type, an additional memory of the size of one raster is provided between the sensor section (rows and columns of photodiodes with interposed vertical transport channels) and the horizontal output register, into which extra memory the entire raster is written after integration in a time which is small compared with the integration time.

The image sensor is of a construction which is known per se, comprising a photosensitive integration section 1, a memory section 2 screened against radiation, and a horizontal output register 3. The charge packages are transported row by row from the memory section 2 into the output register 3 and are subsequently transported to the left in the register 3 and read out through the output amplifier 4 in a time interval which will be called active line time hereinafter.

For operating the device, means 5 are provided by which the imaging device can be set for one of at least two states. In the first state, the signals from the entire matrix of the imaging section 1 are used as active video information; in the other state, the information generated in a number of columns is not used as active video information and should accordingly be drained off in some way. According to the invention, the columns whose information is not used in the second state are arranged in two strips 6 and 7 situated on either side of the matrix formed by the imaging section and the memory section. These strips have been hatched in FIG. 1 for greater clarity. The center of the portion of the imaging section which is used does not change its place when the system is switched from the one state into the other state, and can accordingly coincide with the optical center of the optical system (not shown in the drawing) in either state. This configuration is possible because the charge packages in the columns 7, which are placed in the horizontal register 3 simultaneously with the active information, are drained off through the output of this register in a rime interval which lies before the active line rime belonging to this line and after the active line time of the preceding line. This time interval will be referred to as horizontal flyback time hereinafter on the analogy of the terminology in picture display systems.

The invention may be used in various situations in which the dimensions and/or the relative dimensions of the image are to be changed. In the present embodiment, the aspect ratio may be set as desired by means of the invention. The width/height ratio of the non-hatched portion of the imaging section 1 is at least substantially 3 to 4, the number of columns of this section being, for example, 720. The width of the strips 6 and 7 is so chosen, for example 130 columns, that the width/height ratio of the imaging section 1 including the strips 6 and 7 changes into 16 to 9.

The signals which determine whether the device is operated in the one or in the other state are generated by the block 5 which may comprise inter alia a synchronization circuit (sync. pulse i.e.) and a pulse pattern generator (ppg i.c.). The block 5 controls the block 8 which comprises a number of driver circuits which supply the required clock voltages for the imaging section 1, the memory section 2, and the readout register 3.

Figure 2A:
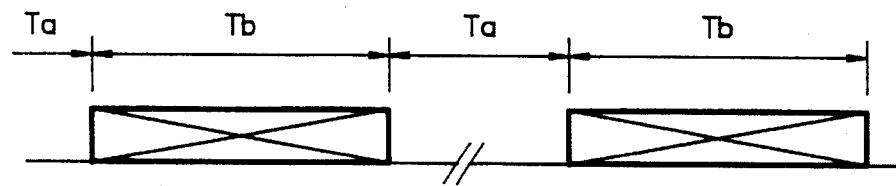
FIG. 2 is a time diagram of the device of FIG. 1 during operation.
Figure 2B:
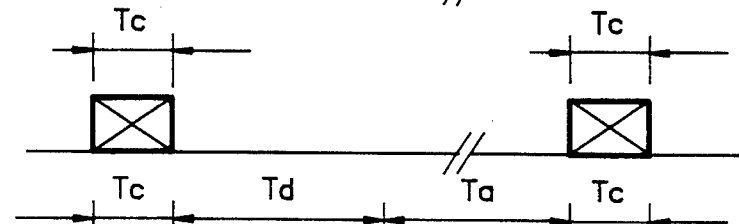
Figure 2C:
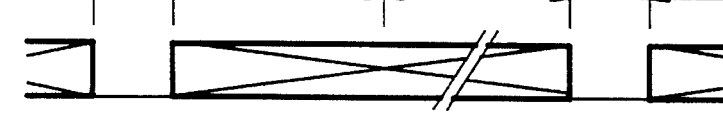

In the diagram of FIG. 2a, $T_a$ indicates the active line time and $T_b$ the flyback time. The active line time $T_a$ is, for example, 52 μsec, the flyback time $T_b$ is, for example, 12 μsec. If the imaging device is operated for the 16 to 9 ratio, so that the information of all 980 columns is used as active video information, a line from the memory 2 is put in the readout register 3 during the flyback time $T_b$ each time. The charge packages of this line are subsequently read out in usual manner in the active line time $T_a$ with a frequency of, for example, 19 MHz. When the imaging device is operated in the 3 to 4 state, so that the 260 columns in the strips 6 and 7 are not used, the clock frequency of the readout register 3 is reduced to, for example, 14 MHz. During the time $T_c$ (FIG. 2b), which is, for example 2.5 μsec, an entire line including charge from the columns 6 and 7 is put in the readout register 3. In the remaining 9.5 μsec of the flyback time $T_b$, indicated with $T_d$ in FIG. 2c, the 130 charge packages coming from the strip 7 are drained off by means of the usual charge transport in CCDs at a frequency of 14 MHz. Then the 720 charge packages from the central portion of the device are read out during the active line time $T_a$ (see FIG. 2c) and used as active video information. After the active line time $T_a$, when the said 720 signals have been read through the amplifier 4, charge transport is stopped. The last 130 charge packages coming from the strip 6 are still in the readout register 3 at the level of the strip 7. In the ensuing period $T_c$, which forms part of the next flyback time, the next line of video information is moved from the memory 2 into the output register 3. The charge packages from strip 7 are added to the charge packages from strip 6 still present from the preceding line in the output register 3. During the remainder $T_d$ of the flyback time, the 130 charge packages just joined together are drained off, after which the 720 signals from the central portion of the imaging section are read out in the active line time. In this manner, the entire 4 to 3 matrix can be read out, while the non-active information from the strips 6 and 7 is entirely drained away during the flyback time.

It is noted that it is not necessary in principle to join together the charges from the strips 6 and 7. Thus, for example, the output register 3 may be extended at the side facing the amplifier 4 by a number of extra storage locations in which the charge packages from the strip 6 are stored before a new line is transported into the output register, after which, in the flyback time, these charge packages are drained off followed by the charge packages from strip 7. In an alternative embodiment, an output register identical to that in FIG. 1 is used, and the charges coming from the strip 6 are drained off immediately after the active line time and before a new line is placed in the register 3. In both embodiments, however, draining of the excess charge packages does require extra transport steps and time. If the charge packages are added together, as in the embodiment described, draining takes only 130 instead of 260 transport steps. The storage capacity in at least the 130 storage locations situated in front of the output of register 3 must be sufficiently large for accommodating double the charge packages of maximum size in the imaging section/memory section. In the simplest embodiment, this is achieved by adaptation of the width of the register 3. Obviously, alternative known techniques, such as the choice of the dopant concentration and/or the value of the applied clock voltages, or combinations of various methods may be used.

In the embodiment described here, the removal of the excess charge packages takes place with the same clock frequency as reading of the active information. If this method takes comparatively too much time, for example, in view of the time required for transferring the charge from the memory section into the register 3, a higher clock frequency may be used for the removal of the charge from the strips 6 and 7 than for reading the active information. The said 19 MHz clock voltage with which the information is read out in the case in which the aspect ratio is 16/9 may advantageously be used for draining off the excess charge. The time required for draining off 130 packages is then only approximately 6.8 μsec, so that more time is available for the memory-output register transport.

Figure 3:
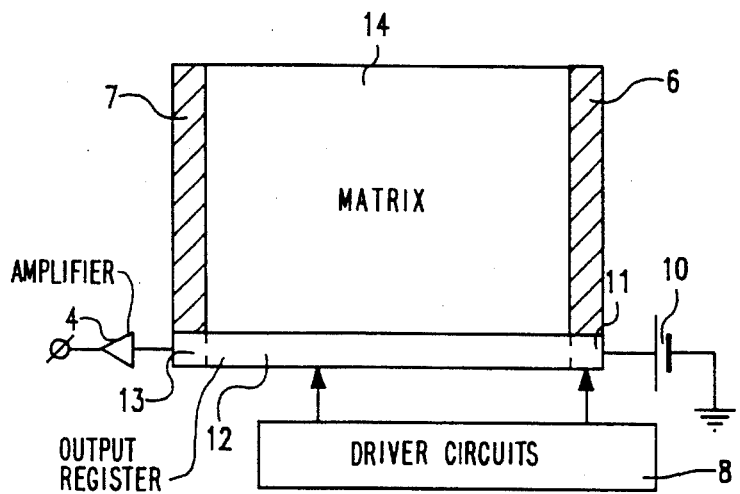
FIG. 3 is a diagram of a second embodiment of an imaging device according to the invention.

FIG. 3 diagrammatically shows an embodiment of a solid state imaging device according to the invention in which the excess charge packages from the strip 6 (when the width/height ratio is 4/3) are not transported to the output amplifier 4, but are removed through an extra output 10 at the side remote from the amplifier 4. In this arrangement, the clock voltages to the gates (not shown) in the portion 11 of the register 3 are applied in a different order compared with the clock voltages at the gates of the remaining portions 12–13 of the register 3, so that the charge transport in the portion 11, at least during the flyback time for draining off the excess charge from strip 6, is to the fight, while it is to the left in the portions 12 and 13. When the portion 11 of the register 3 is empty, while at the same time the excess charge from strip 7 was drained off through the output at the left-hand side of the register, the clock voltages in the portion 11 may or may not be stopped, while the charge transport in the portions 12 and 13 is continued in the active line time for reading out the active information. When the imaging device is operated in the width/height ratio 16/9 state, the charge transport direction in the portion 11 is reversed in that the portion 11 receives the same clock voltages as the portions 12 and 13, so that the entire line can be read out through the amplifier 4.

Since charge transport must be possible in two directions in the portion 11, an output register is preferably used without a built-in transport direction, as is often the case in 2-phase CCDs. A 3- or 4-phase CCD may accordingly be advantageously used for the register 3.

It is noted that the matrix 14 is shown as being adjacent to the register 3 in FIG. 3 of the imaging device. The region 14 may correspond to the memory section 2 of the preceding embodiment. In an alternative embodiment, in which a separate memory section is not necessary, the region 14 may correspond to the imaging section 1 in FIG. 1. In the case of an interline sensor, the region 14 is formed by columns of photodiodes, interspaced by vertical transport lines coupled to the register 3.

It will be clear that the invention is not limited to the embodiments described here, but that many more variations are possible to those skilled in the art. Thus the width/height ratio may vary in a different manner than the conversion between the 4/3 standard and the 16/9 standard described here. It is also possible to combine a reduction in the width of the picture as described above with a reduction in its height.

I claim:

1. A charge-coupled solid state imaging device comprising a system of sensor elements arranged in rows and columns for converting photo-radiation into electric charges which are transported parallel to the column direction by vertical charge coupled transport means screened against radiation and forming a memory for storing charge packets generated in the sensor elements to a single horizontal readout register comprising a charge-coupled device into which the charges are entered row by row and subsequently read out at an output of the single horizontal register during an active line time interval, means for setting the device in a selected one of two states to obtain a desired image aspect ratio, a first state for obtaining a first image aspect ratio of at least about 16 to 9 in which the signals from all columns of the system are used and a second state for obtaining a second image aspect ratio of at least about 4 to 3 in which the signals from a number of columns are not used, wherein the columns not used in the second state of the device form two strips of columns on two opposite ends of the system, the charges derived from these columns being transferred to the single horizontal readout register simultaneously with the charges from the columns which are used and subsequently being drained from the register in a horizontal blanking interval which lies between two consecutive active line time intervals to increase a frame rate of the imaging device, and wherein in said second state, the charges coming from the unused columns are transported into the horizontal register in the same direction as the used columns and are drained off partly before the active line time interval in which the used charges are read out and partly after this active line time interval.

2. A solid state imaging device as claimed in claim 1, characterized in that the horizontal register has a length which corresponds to the number of columns.

3. A solid state imaging device as claimed in claim 1, characterized in that the horizontal register is provided with charge storage locations having a charge storage capacity which is at least substantially double the charge storage capacity of the sensor elements.

4. A solid state imaging device as claimed in claim 1, characterized in that the horizontal register is coupled to a drain at the side remote from the side where the charges which are used are read out, through which drain in said second state the charges coming from the columns which are not used and which are situated at this side of the system are drained off through a reversal of the transport direction in the corresponding portion of the horizontal register.

5. A solid state imaging device as claimed in claim 1, characterized in that clock voltages are applied for the charge transport in the horizontal register which in the second state of the device during draining-off of the unused charges have a frequency which is higher than the frequency of the clock voltages in the active line time.

6. A solid state imaging device as claimed in claim 1, characterized in that said frequency of the clock voltages during draining-off of the unused charges is equal to the frequency of the clock voltages which are applied in the active line time in the first state in which the charges of all columns are used.

7. A solid state imaging device as claimed in claim 1, characterized in that said strips on the two ends of the system comprise an equal number of columns.

8. A solid state imaging device as claimed in claim 1, characterized in that the system of sensor elements and the vertical transport means form part of a charge-coupled imaging device of one of the frame transfer type and the interline type.

* * * * *